United States Patent
Hirose et al.

(10) Patent No.: US 9,947,460 B2
(45) Date of Patent: Apr. 17, 2018

(54) OXIDE CERAMIC AND CERAMIC ELECTRONIC COMPONENT

(71) Applicant: Murata Manufacturing Co., Ltd., Nagaokakyo-shi, Kyoto-fu (JP)

(72) Inventors: Sakyo Hirose, Nagaokakyo (JP); Tsuyoshi Kimura, Nagaokakyo (JP)

(73) Assignee: MURATA MANUFACTURING CO., LTD., Nagokakyo-Shi, Kyoto-Fu (JP)

( * ) Notice: Subject to any disclaimer, the term of this patent is extended or adjusted under 35 U.S.C. 154(b) by 255 days.

(21) Appl. No.: 15/017,784

(22) Filed: Feb. 8, 2016

(65) Prior Publication Data

US 2016/0155562 A1 Jun. 2, 2016

Related U.S. Application Data

(63) Continuation of application No. PCT/JP2014/065234, filed on Jun. 9, 2014.

(30) Foreign Application Priority Data

Aug. 22, 2013 (JP) ................................. 2013-172516

(51) Int. Cl.
  *C04B 35/26* (2006.01)
  *H01F 27/29* (2006.01)
  (Continued)

(52) U.S. Cl.
  CPC ........... *H01F 27/292* (2013.01); *B32B 18/00* (2013.01); *C04B 35/26* (2013.01); *C04B 35/2633* (2013.01); *C04B 35/2666* (2013.01); *C04B 35/6265* (2013.01); *C04B 35/634* (2013.01); *C04B 35/638* (2013.01); *H01F 1/344* (2013.01); *H01F 21/08* (2013.01);
  (Continued)

(58) Field of Classification Search
  USPC ............................................ 252/62.63, 62.58
  See application file for complete search history.

(56) References Cited

U.S. PATENT DOCUMENTS 3,078,234 A * 2/1963 Davis, Jr. ............ C04B 35/2666
                                                           252/62.56
3,638,207 A * 1/1972 Smith ................. C04B 35/2608
                                                           252/62.56
(Continued)

FOREIGN PATENT DOCUMENTS

JP       58191962 A     11/1983
JP       03-048644 B     7/1991
(Continued)

OTHER PUBLICATIONS

International Search Report for PCT/JP2014/065234 dated Sep. 9, 2014.
Written Opinionfor PCT/JP2014/065234 dated Sep. 9, 2014.

*Primary Examiner* — Matthew E Hoban
(74) *Attorney, Agent, or Firm* — Arent Fox LLP

(57) ABSTRACT

An oxide ceramic represented by the general formula $[Sr_{2-x}Ba_xCo_{2-y}(Zn_uNi_{1-u})_yFe_{12-z}Al_zO_{22}]$. In the formula, $0.7 \leq x \leq 1.3$ and $0.8 \leq z \leq 1.2$. y is $0 \leq y \leq 0.8$ when $0.5 \leq u \leq 1.0$ and is $0 \leq y \leq 1.6$ when $0 \leq u \leq 0.5$. y is preferably 0.4 or less. Further, a variable inductor as a ceramic electronic component has a component base body formed from the oxide ceramic.

20 Claims, 5 Drawing Sheets

(51) Int. Cl.
    *B32B 18/00*     (2006.01)
    *C04B 35/626*     (2006.01)
    *C04B 35/634*     (2006.01)
    *C04B 35/638*     (2006.01)
    *H01F 1/34*     (2006.01)
    *H01F 21/08*     (2006.01)

(52) U.S. Cl.
    CPC ......... *C04B 2235/3213* (2013.01); *C04B 2235/3215* (2013.01); *C04B 2235/3217* (2013.01); *C04B 2235/3272* (2013.01); *C04B 2235/3277* (2013.01); *C04B 2235/3279* (2013.01); *C04B 2235/3284* (2013.01); *C04B 2235/442* (2013.01); *C04B 2235/6025* (2013.01); *C04B 2235/663* (2013.01); *C04B 2235/767* (2013.01); *C04B 2237/34* (2013.01)

(56) References Cited

U.S. PATENT DOCUMENTS

| | | | |
|---|---|---|---|
| 5,118,575 A * | 6/1992 | Maekawa | G11B 5/70678 252/62.59 |
| 5,183,631 A * | 2/1993 | Kugimiya | B22F 1/02 419/10 |
| 6,284,150 B1 * | 9/2001 | Ogata | C01G 49/0054 252/62.51 C |
| 6,402,980 B1 * | 6/2002 | Taguchi | C04B 35/2633 252/62.57 |
| 6,537,463 B2 * | 3/2003 | Iwasaki | H01F 1/059 148/301 |
| 2004/0254058 A1 * | 12/2004 | Takagi | C04B 33/1327 501/117 |
| 2006/0284136 A1 * | 12/2006 | Takami | H01F 1/11 252/62.63 |
| 2009/0196818 A1 | 8/2009 | Yoshinori et al. | |
| 2009/0218540 A1 * | 9/2009 | Takami | C01G 49/0018 252/62.57 |
| 2009/0314981 A1 * | 12/2009 | Yanagida | C04B 35/2633 252/62.55 |
| 2012/0229354 A1 * | 9/2012 | Ishikura | C04B 35/2633 343/787 |

FOREIGN PATENT DOCUMENTS

| | | |
|---|---|---|
| JP | H04343058 A | 11/1992 |
| JP | 2007055832 A | 3/2007 |
| JP | 2009224563 A | 10/2009 |
| JP | 2012001396 A | 1/2012 |
| WO | WO 2007135817 A | 11/2007 |
| WO | WO 2014061671 A | 4/2014 |

* cited by examiner

OXIDE CERAMIC AND CERAMIC ELECTRONIC COMPONENT

CROSS REFERENCE TO RELATED APPLICATIONS

The present application is a continuation of International application No. PCT/JP2014/065234, filed Jun. 9, 2014, which claims priority to Japanese Patent Application No. 2013-172516, filed Aug. 22, 2013, the entire contents of each of which are incorporated herein by reference.

FIELD OF THE INVENTION

The present invention relates to an oxide ceramic and a ceramic electronic component, and more particularly to an oxide ceramic formed from a ferromagnetic dielectric material exhibiting an electromagnetic effect, and a ceramic electronic component, such as a variable inductor, using the oxide ceramic.

BACKGROUND OF THE INVENTION

In recent years, ferromagnetic dielectric (multiferroics) materials, in which a ferromagnetic property and ferroelectricity coexist and exhibit a composite action, have been receiving attention and actively researched and developed.

The ferromagnetic dielectric material is known to exert a so-called electromagnetic effect: the action of a magnetic field induces helical magnetic ordering to produce ferroelectricity, thereby generating electric polarization, or causing changes in electric polarization or dielectric constant; and the action of an electric field generates magnetization or causes changes in magnetization.

The ferromagnetic dielectric material which can, due to the electromagnetic effect mentioned above, cause changes in magnetization by an electric field and changes in electric polarization by a magnetic field, is thus expected to be applied to various types of ceramic electronic components such as variable inductors that change in magnetic permeability or magnetization through the application of an electric field, variable magnetization devices for writing heads of storage media, or magnetic sensors for detecting magnetism, and further non-volatile memories.

Furthermore, for example, Patent Document 1 proposes a multiferroic element where the orientation of electric polarization substantially orthogonal to an external magnetic field is adapted to be controlled by applying the external magnetic field to a multiferroic solid material that has both ferroelectricity and a ferromagnetic property that has a spin structure with a spin orientation rotating to follow the outside of a cone (the vertex of the cone has an opening angle $\alpha$ in the range of 0 degrees$<\alpha \leq 90$ degrees).

In Patent Document 1, with the use of $CoCr_2O_4$ (M=Mn, Fe, Co, Ni) as a ferromagnetic dielectric material (multiferroic material), electric polarization is generated by the action of a magnetic field in the range of extremely low temperatures around 26 K, and electric polarization of 2 $\mu C/m^2$ is obtained around 5 K.

In addition, Patent Document 2 proposes a multiferroic element adapted to induce an electric current by a weak external magnetic field of 300 gauss or less, with a multiferroic solid material containing an iron oxide as a main raw material, which has both ferroelectric and ferromagnetic properties.

Patent Document 2 mentions that when a low magnetic field of 300 G (0.03 T) acts with the use of a ferrite compound of $Ba_2Mg_2Fe_{12}O_{22}$ as a ferromagnetic dielectric material (multiferroic material), an electric current flow in response to the application of an alternating magnetic field at $-268°$ C. (5 K), and electric polarization is also generated to alternate positive and negative.

Furthermore, Patent Document 3 proposes an electromagnetic effect material composed of, as a main constituent, an oxide ceramic represented by the general formula $(Sr_{1-\alpha}Ba_{\alpha})_3(Co_{1-\beta}B_{\beta})_2Fe_{24}O_{41+\delta}$ (where B represents one or more elements selected from the group consisting of Ni, Zn, Mn, Mg and Cu, and $\alpha$, $\beta$, and $\delta$ respectively meet the formulas: $0 \leq \alpha \leq 0.3$, $0 \leq \beta \leq 0.3$, and $-1 \leq \delta \leq 1$), which has an electromagnetic effect in a temperature range of 250 to 350 K and in a magnetic field range of 0.05 T (tesla) or less.

In Patent Document 3, a ferromagnetic dielectric material that has a hexagonal Z-type crystal structure as represented by the above-mentioned general formula is achieved which has a domain with electric polarization of 1.0 to 9.5 $\mu C/m^2$ and an electromagnetic coupling coefficient of 100 ps/m or more around room temperature and in a magnetic field range of 0.05 T or less, and up to 470 ps/m, obtained by sweeping between $-0.05$ T and $+0.05$ T with the use of the ferromagnetic dielectric material.

Patent Document 1: International Publication No. WO 2007/135817 (claims 1, 3, paragraph number [0031], FIG. 7, etc.)

Patent Document 2: Japanese Patent Application Laid-Open No. 2009-224563 (claims 1, 3, paragraph number [0032], FIG. 7, etc.)

Patent Document 3: Japanese Patent Application Laid-Open No. 2012-1396 (claim 1, paragraph numbers [0010], [0061], Table 3, FIG. 3, etc.)

SUMMARY OF THE INVENTION

Now, there is a need to produce an electromagnetic effect at room temperature in order to apply a ferromagnetic dielectric material to various types of electronic components such as variable inductors and non-volatile memories.

However, in Patent Documents 1 and 2, electromagnetic effects are produced only in low-temperature ranges substantially lower than room temperature, but not able to be produced at room temperature, and there is thus a difficult situation faced to achieve various types of practical ceramic electronic components that utilize electromagnetic effects.

In addition, in Patent Document 3, the use of the ferromagnetic dielectric material which has a hexagonal Z-type crystal structure achieves an electromagnetic coupling coefficient up to 470 ps/m around room temperature, but fails to achieve the maximum value in a substantial zero field (in the range of the zero field to near the zero field), and there is a need for a magnetic bias on the order of 5 to 10 mT in order to achieve a large electromechanical coupling coefficient. Moreover, while a relatively large electromagnetic coupling coefficient is achieved as mentioned above in Patent Document 3, the advent of ferromagnetic dielectric materials with further large electromagnetic coupling coefficients is desired in order to achieve practical ceramic electronic components.

The present invention has been made in view of such circumstances, and an object of the present invention is to provide an oxide ceramic which is easily able to produce a greater electromagnetic effect at room temperature as compared with that of the prior art, and a ceramic electronic component using the oxide ceramic.

The oxide ceramic formed from a ferrite compound represented by the general formula $(Sr,Ba)_2Co_2Fe_{12}O_{22}$ is able to have electric polarization generated and controlled in a low magnetic field, and moreover maintain helical magnetic ordering capable of producing ferroelectricity in a stable manner up to a relatively high temperature, and thus considered able to produce an electromagnetic effect at room temperature through improvement.

Therefore, the inventors have taken a process of trial and error and carried out earnest studies on the $(Sr,Ba)_2Co_2Fe_{12}O_{22}$ compound by substituting some of the Co with Zn or Ni, and further substituting some of the Fe with Al, and come up with a finding that the combination ratio between Ba and Sr at the Ba site, the combination ratio between Co and (Zn, Ni) at the Co site, and the combination ratio between Fe and Al at the Fe site are adapted to fall within predetermined ratios, thereby making it possible to achieve a substantially larger electromagnetic coupling coefficient at room temperature and in a zero field to a range near the zero field, which has not been able to be achieved conventionally, and moreover achieve a ferromagnetic dielectric body with favorable electric polarization in a low magnetic field.

Furthermore, as a result of further earnest studies of the present inventors, it has been determined that while the $(Sr,Ba)_2Co_2Fe_{12}O_{22}$ compound typically has a hexagonal Y-type crystal structure, a similar effect is achieved by containing predetermined amounts of Sr, Ba, Zn, Ni, and Al in the forms described above as long as a ferrite compound has a main constituent containing therein Sr, Ba, Co, and Fe, even when the symmetry is slightly displaced from the hexagonal system to produce a crystal system that is lower in symmetry than the hexagonal system.

The present invention has been made on the basis of these findings, and an oxide ceramic according to the present invention is formed from a ferrite compound containing at least Sr, Ba, Co, and Fe, and characterized in that the Ba is contained in the form of substitution for some of the Sr, and x is 0.7 to 1.3 when the content of the Ba is expressed as x/2 in molar ratio with respect to the total of the Ba and the Sr, at least either one element M of Zn and Ni is contained in the form of substitution for some of the Co, and when the content of the element M is expressed as y/2 in molar ratio with respect to the total of the element M and the Co, y is 0.8 or less (including 0) when the M is formed of Zn and when the element M is combined so that the content of the Zn is equal to or more than the content of the Ni in molar ratio, or y is 1.6 or less (including 0) when the element M is formed of Ni and when the element M is combined so that the content of the Zn is less than the content of the Ni in molar ratio, and Al is contained in the form of substitution for some of the Fe, and z is 0.8 to 1.2 when the content of the Al is expressed as z/12 in molar ratio with respect to the total of the Al and the Fe.

In addition, the oxide ceramic according to the present invention is preferably represented by the general formula $[Sr_{2-x}Ba_xCo_{2-y}(Zn_uNi_{1-u})_yFe_{12-z}Al_zO_{22}]$ (where $0.7 \leq x \leq 1.3$, $0 \leq y \leq 0.8$, $0.8 \leq z \leq 1.2$, $0.5 \leq u \leq 1.0$).

Furthermore, the oxide ceramic according to the present invention is also preferably represented by the general formula $[Sr_{2-x}Ba_xCo_{2-y}(Zn_uNi_{1-u})_yFe_{12-z}Al_zO_{22}]$ (where $0.7 \leq x \leq 1.3$, $0 \leq y \leq 1.6$, $0.8 \leq z \leq 1.2$, $0 \leq u \leq 0.5$).

In addition, the inventors have further carried out earnest studies to determine that the control of the y to 0.4 or less can ensure a sufficient insulation property even when the heat treatment after firing is performed in an oxygen atmosphere at 0.1 MPa (atmospheric pressure), thereby making it possible to obtain a ferromagnetic dielectric body with higher electric polarization through a simple production process.

More specifically, in the oxide ceramic according to the present invention, the y is preferably 0.4 or less.

In addition, the oxide ceramic according to the present invention is, when the y is 0.4 or less, preferably subjected to heat treatment in the air atmosphere.

Thus, due to the fact that a simple production process is required without the need for heat treatment in a high oxygen atmosphere, the oxide ceramic can be produced at relatively low cost, which is considered suitable for mass productivity.

In addition, in the oxide ceramic according to the present invention, the electromagnetic coupling coefficient serving as an index of a ferromagnetic dielectric body preferably represents a maximum value in a substantial zero field as a magnetic field applied.

Thus, a desired large electromagnetic coupling coefficient can be achieved without requiring any magnetic bias.

The term "substantial zero field" herein means including not only the zero field, but also a range near the zero field (that is, a weak magnetic field region) to the extent that characteristics are not affected.

In addition, in the oxide ceramic according to the present invention, the polarity of electric polarization is preferably reversed when the polarity of the magnetic field is reversed.

Thus, even in a case where the polarity of electric polarization is also reversed when the polarity of a magnetic field applied is reversed, it becomes possible to ensure electric polarization that is at least comparable or superior to that of a material system in which the polarity of electric polarization is not reversed even when the polarity of a magnetic field applied is reversed.

Furthermore, the ceramic electronic component according to the present invention is a ceramic electronic component with an external electrode formed on the surface of a component base body, which is characterized in that the component base body is formed from the oxide ceramic described above.

In addition, the ceramic electronic component according to the present invention preferably has a coil disposed to have an inductance depending on the magnetic permeability of the component base body.

Thus, various types ceramic electronic components can be easily achieved, such as magnetization switches and variable inductors utilizing ferromagnetic dielectric characteristics.

Moreover, in the ceramic electronic component according to the present invention, an internal electrode is also preferably embedded in the component base body.

Advantageous Effect of the Invention

The oxide ceramic according to the present invention is formed from a ferrite compound containing at least Sr, Ba, Co, and Fe, the Ba is contained in the form of substitution for some of the Sr, at least one element M of Zn and Ni is contained in the form of substitution for some of the Co, and Al is contained in the form of substitution for some of the Fe, and the contents of the Ba, element M (Zn, Ni), and Al are adapted to fall within the predetermined ranges as described above. Thus, at room temperature and in a substantial zero field, a substantially larger electromagnetic coupling coefficient can be achieved which has not been able to be achieved conventionally, and a ferromagnetic dielectric body can be achieved which has favorable electric polarization in a low magnetic field.

Furthermore, the ceramic electronic component according to the present invention is a ceramic electronic component with an external electrode formed on the surface of a component base body, and the component base body is formed from the oxide ceramic described above in any of the aspects. Thus, various types of ceramic electronic components can be achieved such as a variable inductor that can produce a great electromagnetic effect at room temperature and in a low magnetic field.

DETAILED DESCRIPTION OF THE INVENTION

Figure 1:
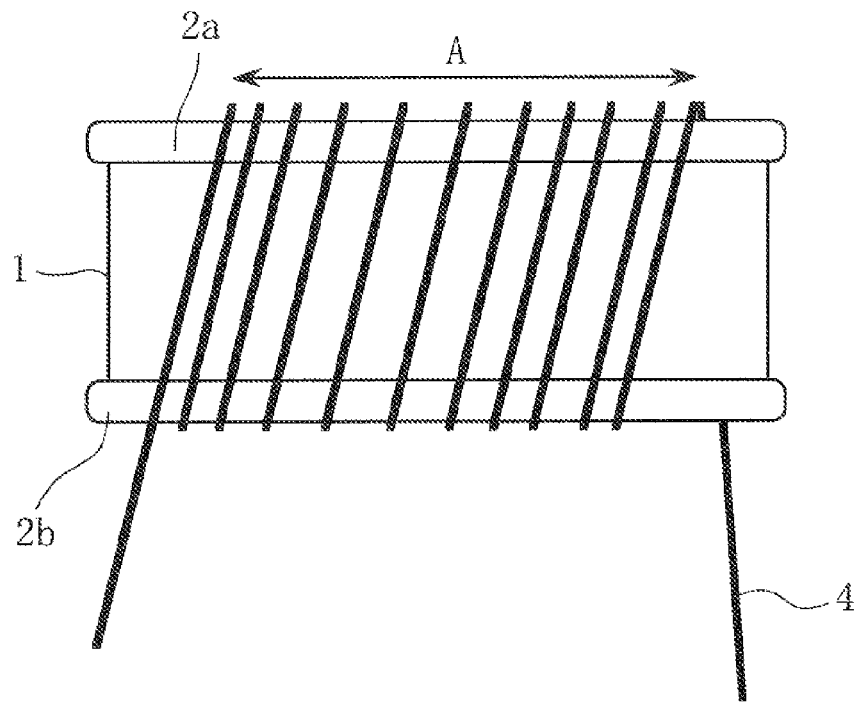
FIG. 1 is a front view illustrating an embodiment of a ceramic electronic component formed with the use of an oxide ceramic according to the present invention.

Next, embodiments of the present invention will be described in detail.

An oxide ceramic as an embodiment of the present invention has a hexagonal Y-type crystal structure containing at least Sr, Ba, Co, and Fe.

This hexagonal Y-type crystal structure has a stacked structure that has S blocks of a spinel structure ($CoO \cdot Fe_2O_3$) and T blocks of a hexagonal closest packing structure with (Sr,Ba) and O (oxygen atom) stacked in the order of T-S-T-S-T-S- . . . .

Further, in the present embodiment, Ba is contained in the form of substitution for some of Sr, and when the content of the Ba is expressed as x/2 in molar ratio, x is supposed to be 0.7 to 1.3.

In addition, the present oxide ceramic may contain at least one element M of Zn and Ni in the form of substitution for some of the Co.

Furthermore, when the content of the element M is expressed as y/2 in molar ratio with respect to the total of the element M and the Co, the y is set as follows depending on the constituent composition of a constituent for the element M.

More specifically, when the element M is formed of Zn, and when the element M is combined so that the content of Zn is equal to or more than the content of Ni in molar ratio, y is set to be 0.8 or less (including 0).

On the other hand, when the element M is formed of Ni, and when the element M is combined so that the content of the Zn is less than the content of Ni in molar ratio, y is set to be 1.6 or less (including 0).

In addition, in the present oxide ceramic, Al is contained in the form of substitution for some of the Fe, and when the content of the Al is expressed as /12 in molar ratio with respect to the total of the Al and the Fe, z is supposed to be 0.8 to 1.2.

Therefore, the present oxide ceramic contains, as its main constituent, a $SrBaCo_2Fe_{12}O_{22}\{(Sr,Ba)O_2 \cdot (CoO)_2 \cdot (Fe_2O_3)_6\}$ compound that has a hexagonal Y-type crystal structure, which can be represented by the following general formula (A).

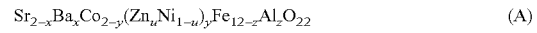

$$Sr_{2-x}Ba_xCo_{2-y}(Zn_uNi_{1-u})_yFe_{12-z}Al_zO_{22} \tag{A}$$

Further, the molar content ratio of Ba to the total of Sr and Ba in the (Sr,Ba) site (hereinafter, referred to as a "molar substitution ratio of Ba") x/2 and the molar content ratio of Al to the total of Fe and Al in the Fe site (hereinafter, referred to as a "molar substitution ratio of Al") z/12 respectively have x and z that meet the mathematical formulas (1) to (2).

$$0.7 \leq x \leq 1.3 \tag{1}$$

$$0.8 \leq z \leq 1.2 \tag{2}$$

In addition, the molar content ratio of the element M to the total of Co and the element M (Zn and Ni) at the Co site (hereinafter, referred to as a "molar substitution ratio of element M") y/2 has y formed to meet the mathematical formulas (3) and (4), depending on the combination ratio between Zn and Ni at the Co site.

Specifically, when the element M is formed of Zn, and when the element M is combined so that the content of the Zn is equal to or more than the content of the Ni in molar ratio, that is, when the mathematical formula (3a) is true, y meets the mathematical formula (3).

$$0.5 \leq u \leq 1.0 \tag{3a}$$

$$0 \leq y \leq 0.8 \tag{3}$$

On the other hand, when the element M is formed of Ni, and when the element M is combined so that the content of the Zn is less than the content of the Ni in molar ratio, that is, when the mathematical formula (4a) is true, y meets the mathematical formula (4).

$$0 \leq u < 0.5 \tag{4a}$$

$$0 \leq y \leq 1.6 \tag{4}$$

As just described, the present oxide ceramic, due to the fact that the general formula (A) meets the mathematical formulas (1) and (2), and meets the mathematical formulas (3) and (4) depending on the combination ratio between Zn and Ni at the Co site, has a favorable insulation property, and also can achieve a large electromagnetic coupling coefficient at room temperature and in a substantial zero field (in the zero field and in a range near the zero field) and makes it possible to achieve favorable electric polarization in a low magnetic field, thereby producing a great electromagnetic effect.

More specifically, in a ferromagnetic dielectric material that shows an electromagnetic effect, when helical magnetic ordering is generated, electric polarization P is induced, and the magnetic ordering can be manipulated by manipulating the direction of the electric polarization with en electric field. Thus, there is a close relationship between the electric polarization P and the magnetic ordering. Accordingly, as indicated in the mathematical formula (5), the change in electric polarization P with respect to a change in magnetic field is defined as an electromagnetic coupling coefficient α, thereby making it possible to evaluate ferromagnetic dielectric characteristics with the electromagnetic coupling coefficient α.

$$\alpha = \mu_0 (dP/dB) \quad (5)$$

In the formula, $\mu_0$ is the magnetic permeability ($=4\pi \times 10^{-7}$ H/m) in a vacuum.

On the other hand, the current density J of the electromagnetic current can be represented by the mathematical formula (6).

$$J = dP/dt \quad (6)$$

Therefore, the electric polarization P can be determined by integrating the current density J of the electromagnetic current with respect to time t.

In addition, the change in electric polarization P with respect to a change in magnetic field B is represented by the mathematical formula (7).

$$dP/dB = (dP/dt)/(dB/dt) = J/(dB/dt) \quad (7)$$

In the formula, dB/dt represents a sweep speed of a magnetic field.

When the mathematical formula (5) is substituted into the mathematical formula (7), the electromagnetic coupling coefficient α can be represented by the mathematical formula (8).

$$\alpha = (\mu_0 \cdot J)/(dB/dt) \quad (8)$$

Accordingly, the electromagnetic coupling coefficient α can be determined by dividing the product of the magnetic permeability $\mu_0$ in a vacuum and the current density J by the sweep speed of a magnetic field (dB/dt).

In addition, the electromagnetic coupling coefficient α is, as is clear from the mathematical formula (8), increased as the current density J of the electromagnetic current is increased. Therefore, as the rate of change in electric polarization P is increased, the electromagnetic coupling coefficient α is increased to make it possible to achieve a giant electromagnetic effect, thereby providing a ferromagnetic dielectric body. Moreover, the electromagnetic coupling coefficient α is determined from the electric polarization P generated by sweeping the magnetic field B, and thus roughly equivalent to the change in magnetization in the case of applying an electric field, and thus, the changes in magnetization and magnetic permeability in the case of applying a voltage as opposite effects are also increased as the electromagnetic coupling coefficient α is increased.

Further, in the present embodiment, as described above, the general formula (A) satisfies the mathematical formulas (1) and 2, and satisfies the mathematical formulas (3) and (4) depending on the combination ratio between Zn and Ni at the Co site, and thus, favorable electric polarization P can be achieved in a low magnetic field, and a large electromagnetic coupling coefficient α can be achieved in a substantial zero field.

In the present embodiment, the electric polarization P is induced in a specific direction in a low magnetic field, and reaches almost zero once to disappear in a substantial zero field, and thereafter, when the polarity is reversed across the zero field, the electric polarization P is also reversed. For example, when the polarity of a magnetic field applied is reversed from positive to negative, the polarity of electric polarization is also reversed from positive to negative, whereas when the polarity of a magnetic field applied is reversed from negative to positive, the polarity of electric polarization is also reversed from negative to positive.

Then, when the polarity of the electric polarization P is reversed with this polarity reversion of the magnetic field, the electric polarization P is induced in a direction opposite to the specific direction mentioned above, thereby making it possible to achieve favorable electric polarization P in a low magnetic field. In addition, the direction of the polarization depends on the polarity in electric field polarization treatment performed in a magnetic field, which will be described later, and can be adjusted to a desired polarization direction.

More specifically, in a conventional ferromagnetic dielectric material, for example, an oxide ceramic of a hexagonal Z-type crystal structure as in Patent Document 3, the polarization of electric polarization is not reversed even when the polarity of a magnetic field applied is reversed from positive to negative, while the present oxide ceramic can ensure electric polarization P comparable to that of such a non-reversion type ferromagnetic dielectric material.

As just described, with the reversion of a magnetic field applied, the polarity of the electric polarization P is reversed in a substantial zero field, and the rate of change in electric polarization P in the zero field is thus also increased, thereby making it possible to achieve a greater electromagnetic coupling coefficient α than ever before in the zero field.

Specifically, a greater electromagnetic coupling coefficient can be achieved, which is approximately three times as large at room temperature even as compared with that of a conventional ferromagnetic dielectric material, for example, an oxide ceramic of a hexagonal Z-type crystal structure as in Patent Document 3.

In this regard, the molar substitution ratio x/2 of Ba has x within the range of 0.7 to 1.3 as represented by the above-mentioned mathematical formula (1), because there is a possibility that it will be difficult to induce a helical magnetic ordering phase at room temperature, thereby resulting in failure to generate electric polarization, while a sufficient insulation property can be ensured by performing heat treatment in an oxygen atmosphere at 0.2 MPa or more even when the molar substitution ratio x/2 of Ba has x less than 0.7 or greater than 1.3.

In addition, the molar substitution ratio y/2 of the element M has y as represented by the mathematical formulas (3) and (4) depending on the combination ratio between Zn and Ni at the Co site, because when the molar substitution ratio y/2 of the element M has y in excess of 0.8 (when u meets the formula 0.5≤u≤1.0) or 1.6 (when u meets the formula 0≤u<0.5), there is a possibility that the molar content of Co will be excessively decreased, thereby resulting in failure to enable the measurement of any electromagnetic current at room temperature, and failure to generate electric polarization.

In addition, in consideration of the atmosphere for the heat treatment after firing, the molar substitution ratio y/2 of the element M preferably has y of 0.4 or less. In order to improve the insulation property as will be described later, the fired ceramic sintered body is typically subjected to heat treatment, and when the molar substitution ratio y/2 of the element M has y in excess of 0.4, there is a need to perform the heat treatment after firing in a high oxygen atmosphere at 0.2 MPa or more, in order to make a sufficient improvement in insulation property. In contrast, when the molar substitution ratio y/2 of the element M has y controlled to 0.4 or less to increase the molar content of Co, a sufficient insulation property is achieved even when the heat treatment after firing is performed under the air atmosphere (0.1 MPa), and thus, in consideration of mass productivity, production cost, etc., the molar substitution ratio y/2 of the element M preferably has y of 0.4 or less.

In addition, it is for the following reason that the molar substitution ratio z/12 of Al is adjusted in the range of 0.8 to 1.2 as represented by the above-mentioned mathematical formula (2).

More specifically, when the molar substitution ratio z/12 of Al has z of less than 0.8, there is a possibility that it will be become difficult to induce a helical magnetic ordering phase at room temperature, thereby making it impossible to generate electric polarization.

On the other hand, when the molar substitution ratio z/12 of Al has z in excess of 1.2, a different phase other than the hexagonal Y-type crystal phase is made likely to be produced in excess of the solid solubility limit of Al, while a sufficient insulation property can be ensured as described above, and for this reason, the different phase blocks the generation of electromagnetic characteristics, thereby making it difficult to achieve electric polarization.

Further, in the above-mentioned embodiment, the ferrite compound of a hexagonal Y-type structure that has a stacking period of an S block and a T block has been described in detail, but a crystal system may be employed in which the crystal is lower in symmetry than a hexagonal system, with the partially collapsed periodic structure of the stacking period.

Further, a crystal system may be employed, in which ions coordinated at a predetermined atomic position of a crystal lattice are slightly displaced therefrom and the crystal is lower in symmetry than a hexagonal system. For example, in the hexagonal Y-type crystal structure, ions constituting a crystal, such as $O^{2-}$ and $Co^{2+}$, are coordinated at predetermined atomic positions whose space group describing the symmetry of the crystal is defined by $P6_3/mmc$. Accordingly, the present invention can also be applied to a crystal structure in which the crystal is lower in symmetry than a hexagonal system with the above-mentioned ions coordinated at the atomic positions defined by another space group through migration from the above-mentioned predetermined atomic positions.

More specifically, in the present oxide ceramic, it is important for the above-mentioned predetermined amounts of Sr, Ba, Zn, Ni, and Al to be contained in the ferrite compound containing at least Sr, Ba, Co, and Fe, and even in a crystal system slightly lower in crystal symmetry than the hexagonal crystal system, a desired object of the present invention can be achieved.

Next, a method of producing the present oxide ceramic will be described in detail.

First, a Fe compound such as $Fe_2O_3$, a Sr compound such as $SrCO_3$, a Ba compound such as $BaCO_3$, a Zn compound such as ZnO, a Ni compound such as NiO, a Co compound such as $Co_3O_4$, and an Al compound such as $Al_2O_3$ are prepared as ceramic base materials.

Then, the respective ceramic base materials are weighed so that in the composition after firing, the above-mentioned general formula (A) satisfies the mathematical formulas (1) and (2) and satisfies the mathematical formulas (3) and (4) depending on the combination ratio between Zn and Ni at the Co site.

Next, these weighed ceramic base materials are put in a grinding mill such as a pot mill, along with a grinding medium such as partially stabilized zirconium (hereinafter, referred to as "PSZ") balls, a dispersant, and a solvent such as pure water, and the contents are sufficiently mixed and ground to obtain a mixture.

Then, the mixture is dried, granulated, and then subjected to calcination at a temperature of 1000 to 1100° C. for a predetermined period of time under the air atmosphere to obtain a calcined product.

Then, this calcined product is granulated, and then again put in a grinding mill together with a grinding medium, a dispersant, and an organic solvent such as ethanol or toluene, subjected to sufficient mixing and grinding, and then sufficiently mixed with an addition of a binder solution, thereby providing a ceramic slurry.

It is to be noted that the binder solution is not to be considered particularly limited, but for example, a solution can be used which is obtained by dissolving an organic binder such as a polyvinyl butyral resin in an organic solvent such as ethanol or toluene, and adding an additive such as a plasticizer, if necessary.

Then, the ceramic slurry thus formed is formed into a sheet shape by using a forming process such as a doctor blade method, and the sheet-shaped body is cut into predetermined dimensions to obtain ceramic green sheets. The ceramic green sheets are stacked to reach a predetermined number of sheets, subjected to pressure bonding, and then cut into predetermined dimensions to obtain a ceramic formed body.

Then, this ceramic formed body is subjected to binder removal treatment at 300 to 500° C. under the air atmosphere, and thereafter subjected to firing treatment at 1150 to 1250° C. under the air atmosphere to obtain a ceramic sintered body.

Thereafter, depending on y of the molar substitution ratio y/2 of the element M, the sintered body is subjected to sufficient heat treatment under an atmosphere with an oxygen concentration of 0.1 MPa (atmospheric pressure) or 0.2 MPa or more, thereby preparing the oxide ceramic.

As just described, the present oxide ceramic formed from a ferrite compound containing at least Sr, Ba, Co, and Fe, where the general formula (A) satisfies the mathematical formulas (1) and (2) and satisfies the mathematical formulas (3) and (4) depending on the combination ratio between Zn and Ni at the Co site, can thus achieve a large electromagnetic coupling coefficient α at room temperature and in a substantial zero field without requiring any magnetic bias. In addition, an oxide ceramic of ferromagnetic dielectric body can be achieved which can achieve favorable electric polarization P in a low magnetic field and produce a giant electromagnetic effect at room temperature.

Next, a ceramic electronic component using the present oxide ceramic will be described in detail.

Figure 2:
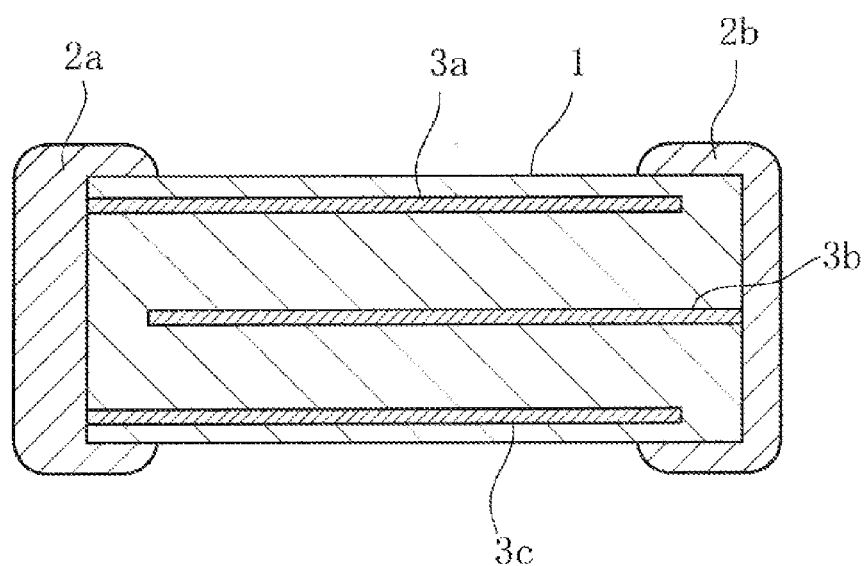
FIG. 2 is a cross-sectional view of FIG. 1.

FIG. 1 is a front view illustrating an embodiment of a variable inductor as a ceramic electronic component according to the present invention, and FIG. 2 is a cross-sectional view thereof.

This variable inductor has a component base body 1 formed from the above-mentioned oxide ceramic, and external electrodes 2a and 2b formed on both ends of the component base body 1.

Further, this variable inductor has a coil arranged so that a magnetic flux passes through the component base body 1 when a high-frequency signal flows. Specifically, in this embodiment, a coil 4 formed from a conductive material such as Cu is wound so as to suspend between the external electrodes 2a and 2b.

Moreover, internal electrodes 3a to 3c are embedded in parallel in the component base body 1. Among these internal electrodes 3a to 3c, the internal electrodes 3a and 3c are electrically connected to one of the external electrodes, the external electrode 2a, whereas the internal electrode 3b is electrically connected to the other external electrode 2b. This ceramic electronic component is allowed to acquire capacitance between the internal electrode 3a and the internal electrode 3b and between the internal electrode 3b and the internal electrode 3c.

It is to be noted that the electrode materials for forming the external electrodes 2a and 2b and the internal electrodes 3a to 3c are not to be particularly limited as long as the materials have favorable conductivity, and various types of metal materials can be used such as Pd, Pt, Ag, Ni and Cu.

In the thus configured variable inductor, the component base body 1 is formed from the above-mentioned oxide ceramic composed of the ferromagnetic dielectric body, and the coil 4 is wound so as to suspend between the external electrode 2a and the external electrode 2b. Thus, when a high-frequency signal is input to the coil 4, the magnetic flux generated in the direction of the arrow A passes through the component base body 1 to achieve an inductance depending on the number of turns of the coil, the shape of an element, and the magnetic permeability of the component base body 1. Further, when a voltage (electric field) is applied to the external electrodes 2a and 2b, a change in magnetization is produced by an electromagnetic effect to make it possible to vary the inductance L of the coil. Thus, it becomes possible to control the change rate ΔL of the inductance L by varying the voltage.

Furthermore, because the component base body 1 is formed from the above-described oxide ceramic according to the present invention, a variable inductor can be achieved which has a favorable insulation property, requires no magnetic bias on the grounds that a large electromagnetic coupling coefficient is achieved at room temperature and in a substantial zero field, and has a giant electromagnetic effect on the grounds that electric polarization is achieved in a low magnetic field.

The variable inductor can be produced in the following way.

First, a ceramic green sheet is prepared in accordance with the same method and procedure as in the above-mentioned method of producing an oxide ceramic.

Then, a conductive paste for internal electrodes is prepared, which contains a conductive material such as Pd as a main constituent. The conductive paste for internal electrodes is applied onto a ceramic green sheet, and a conductive layer in a predetermined pattern is formed on the surface of the ceramic green sheet.

Thereafter, the ceramic green sheet with the conductive layer formed thereon and a ceramic green sheet without any conductive layer formed thereon are stacked in a predetermined order, and thereafter, the stack is cut into predetermined dimensions to obtain a ceramic formed body.

Then, this ceramic formed body is subjected to binder removal treatment at 300 to 500° C. under the air atmosphere, and thereafter subjected to firing treatment at 1150 to 1250° C. under the air atmosphere to obtain a ceramic sintered body.

Thereafter, the sintered body is subjected to heat treatment in a predetermined oxygen atmosphere that is suitable for the molar substitution ratio y of the element M, thereby preparing the component base body 1.

Then, a conductive paste for external electrodes, which contains Ag or the like as a main constituent, is applied to both ends of the component base body 1, and subjected to baking treatment to prepare the external electrodes 2a, 2b, and thereafter, polarization treatment is performed.

First, a predetermined magnetic field is applied at room temperature to produce magnetic field polarization, and then, a predetermined electric field is applied in a direction orthogonal to the direction of the magnetic field to produce electric field polarization, thereby preparing a variable inductor. Performing the polarization treatment in the magnetic field in this manner can achieve a larger electromagnetic effect.

Then, finally, the coil 4 is wound around the component case body 1 so as to suspend between the external electrodes 2a and 2b, thereby producing a variable inductor.

It is to be noted that the present invention is not to be considered limited to the above-mentioned embodiment. While the variable inductor has been described in the above-mentioned embodiment, the oxide ceramic according to the present invention is also applicable to various types of ceramic electronic components other than variable inductors, on the grounds that the oxide ceramic can achieve a large electromagnetic coupling coefficient at room temperature and in a substantial zero field, and induce electric polarization in a low magnetic field to produce a great electromagnetic effect. More specifically, the invention makes it possible to achieve a magnetic sensor that outputs an electric current depending on the magnitude of a magnetic field, a current sensor that outputs an electric current depending on the magnitude of a magnetic field formed by an electric current flowing through a coil, a non-volatile memory that controls magnetization with an electric field, a variable capacitance device, etc.

Further, while the electric field polarization is produced in the magnetic field in a direction orthogonal to the direction of the magnetic field in the above-mentioned embodiment, a great electromagnetic effect can be achieved even when the direction of the magnetic field is the same as the direction of the electric field polarization in the case of polycrystals as crystal grains.

Further, a great electromagnetic effect can be achieved even when electric field polarization is produced with no magnetic field applied after magnetic field polarization, which can be appropriately selected depending on the type of usage or the environment of usage.

In addition, while the general formula (A) has been given as an example of the present oxide ceramic in the embodiment mentioned above, any oxide ceramic may be adopted as long as the ceramic contains at least Sr, Ba, Co, Zn, Fe, and Al within the predetermined ranges, and may contain additives such as Zr, for example. In addition, also as for the molar content ratio of O (oxygen), a slight deviation from the stoichiometric ratio is allowed to the extent that characteristics are not affected. Moreover, MgO and $ZrO_2$ may be added in order to improve the insulation resistance, and it is possible to achieve a similar effect as long as the main constituent within the scope of the present invention constitutes the oxide ceramic.

Next, examples of the present invention will be specifically described.

EXAMPLE 1

$Fe_2O_3$, $SrCO_3$, $BaCO_3$, $Co_3O_4$, ZnO, and $Al_2O_3$ were prepared as ceramic base materials.

Then, the ceramic base materials were weighed so that the x, y, and z of the molar substitution ratio x/2 of Ba, molar substitution ratio y/2 of Zn, and molar substitution ratio z/12 of Al after firing provided the compositions shown in Table 1.

Next, the ceramic base materials thus weighed were put in a pot mill made of polyethylene together with an aqueous polymer dispersant (from Kao Corporation, KAOCER 2210), pure water, and PSZ balls, and mixed and ground for 16 hours to obtain a mixture.

Next, the mixture was dried, granulated, and then subjected to calcination at a temperature of 1100° C. for 4 hours under the air atmosphere to obtain a calcined product.

On the other hand, separately, a polyvinyl butyral-based binder resin (from SEKISUI CHEMICAL CO., LTD., S-LEC B "BM-2") was dissolved in a mixed solvent of ethanol and toluene, and a plasticizer was added thereto to prepare a binder solution.

Then, the calcined product was granulated, and then put in a pot mill together with a solvent-based dispersant (from Kao Corporation, KAOCER 8000), a mixed solvent of ethanol and toluene, and PSZ balls, mixed and ground for 24 hours, and thereafter with the addition of the above-mentioned binder solution thereto, mixed again for 12 hours, thereby providing a ceramic slurry.

Then, the ceramic slurry thus prepared was formed into a sheet shape of about 50 μm in thickness by using a doctor blade method, and the sheet-shaped body was cut into predetermined dimensions with the use of a die, thereby providing ceramic green sheets. Then, the ceramic green sheets were stacked to reach a predetermined number of sheets, subjected to pressure bonding at a pressure of 196 MPa, and then cut to prepare ceramic formed bodies of sample numbers 1 to 25 with length: 12 mm, width: 12 mm, and thickness: 0.6 mm.

Next, the ceramic formed bodies of sample numbers 1 to 25 were subjected to binder removal treatment at 500° C. under the air atmosphere, and then to firing treatment at 1200° C. for 18 hours under the air atmosphere to prepare ceramic sintered bodies of sample numbers 1 to 25.

Then, the ceramic sintered bodies of sample numbers 1 to 25 were subjected to heat treatment at a temperature of 1090° C. for 10 hours in an oxygen atmosphere at 0.1 MPa (1 atmosphere) or 1 MPa (10 atmospheres), thereby preparing respective component base bodies of sample numbers 1 to 25.

Specifically, the samples of sample numbers 4 to 6, 8, 13, 15, and 22 to 25 were subjected to the heat treatment after the firing in the oxygen atmosphere at 0.1 MPa (air atmosphere), whereas the other samples were subjected to the heat treatment after the firing in the oxygen atmosphere at 1 MPa, thereby preparing the component base bodies.

The dimensions of the component base bodies were 10 mm in length, 10 mm in width, and 0.5 mm in thickness.

Next, both principal surfaces of the component base bodies were subjected to DC sputtering with Pt as a target substance to prepare surface electrodes of about 300 nm in thickness, thereby providing respective samples of sample numbers 1 to 25. It is to be noted that the DC sputtering was carried out by supplying an Ar gas into a vacuum vessel adjusted to 5 mmT and supplying a power of 150 W.

The composition analysis for each of the samples of sample Numbers 1 to 25 with the use of inductively coupled plasma (ICP) emission spectrometric analysis and X-ray fluorescence (XRF) analysis confirmed that the respective samples had the compositions shown in Table 1. Further, checking the crystal structure for each sample by the X-ray diffraction (XRD) method confirmed that the sample had a hexagonal Y-type crystal structure.

[Evaluation of Samples]

For each sample of sample numbers 1 to 25, the measurement of resistivity $\rho$ with the use of a high-resistance measuring instrument (from Keithley Instruments, Inc., U.S.A., Model 6487) confirmed that the samples achieved sufficient insulation properties, with resistivity $\rho$ of 50 MΩ·cm or more.

Next, the respective samples of sample Numbers 1 to 25 were subjected to polarization treatment.

Figure 3:
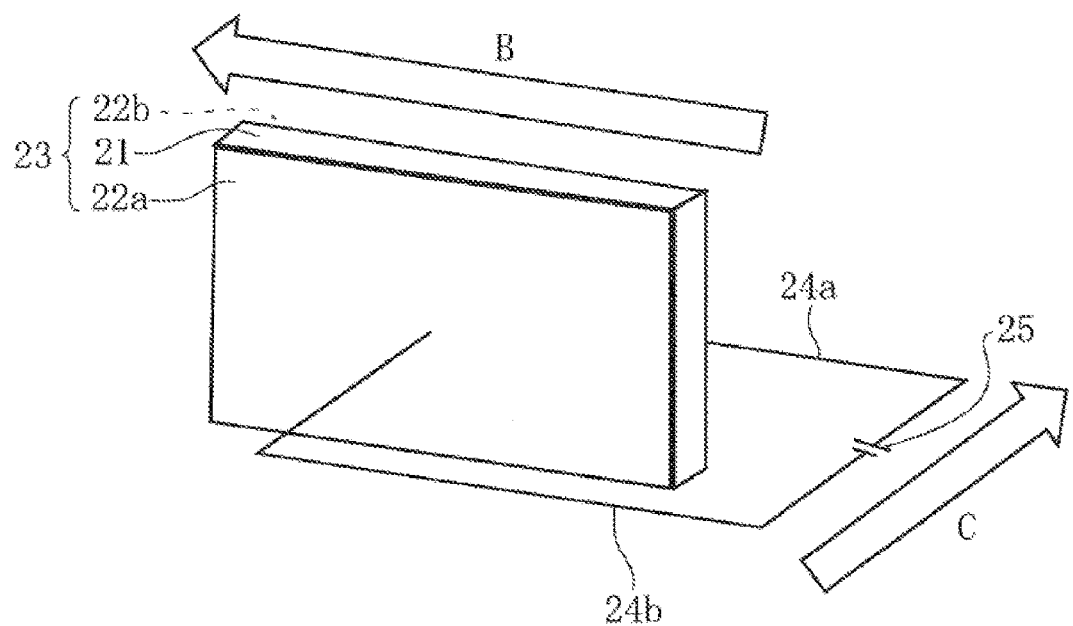
FIG. 3 is a perspective view schematically illustrating a polarization treatment device used in examples.

FIG. 3 is a perspective view schematically illustrating a polarization treatment device.

More specifically, in this polarization treatment device, signal lines 24a and 24b are connected to a sample 23 with surface electrodes 22a and 22b formed on both principal surfaces of a component base body 21, and a DC power source 25 is interposed between the signal line 24a and the signal line 24b.

The sample 23 which has internal electrodes as described above, is placed so that the direction (indicated by the arrow B) of the magnetic field applied to the sample 23 is orthogonal to the direction (indicated by the arrow C) of the electric field in which the electric polarization is performed.

First, with the use of an electromagnet (not shown), a DC magnetic field of 1.5 T was applied at room temperature for 1 minute to produce magnetic field polarization in the direction of the arrow B. Then, the magnitude of the magnetic field was gradually decreased from 1.5 T to 0.5 T while an electric field of 800 V/mm was applied between the surface electrodes 22a and 22b, and electric field polarization was produced for 3 minutes in the direction of the arrow C in the magnetic field of 0.5 T. The formation of the single domain by performing the polarization treatment in the magnetic field as just described makes it possible to achieve a greater electromagnetic effect. While the polarization treatment was performed so that the magnetic field was orthogonal to the electric field in this case, it has been confirmed that substantially equivalent electric polarization P and electromagnetic coupling coefficient $\alpha$ are achieved even when polarization treatment is performed so that a magnetic field is parallel to an electric field.

In addition, the electric field applied is preferably larger, and preferably 200 V/mm or more while depending on the polarization temperature and the composition. In addition, as for the magnetic field applied, a magnetic field (about 1.2 T or more in the case of room temperature) that destroys helical ordering with transition from a ferroelectric phase to a paraelectric phase is preferably applied, and decreased to a magnetic field (1.2 to 0.05 T in the case of room temperature) that induces a ferroelectric phase with the electric field applied.

Next, without applying the electric field and the magnetic field, the evaluation samples were left standing for about 1 hour. Leaving for a predetermined period of time after performing the polarization treatment as just described makes it possible to achieve a much larger electromagnetic effect.

Next, the electromagnetic current for each sample was measured to evaluate characteristics.

Figure 4:
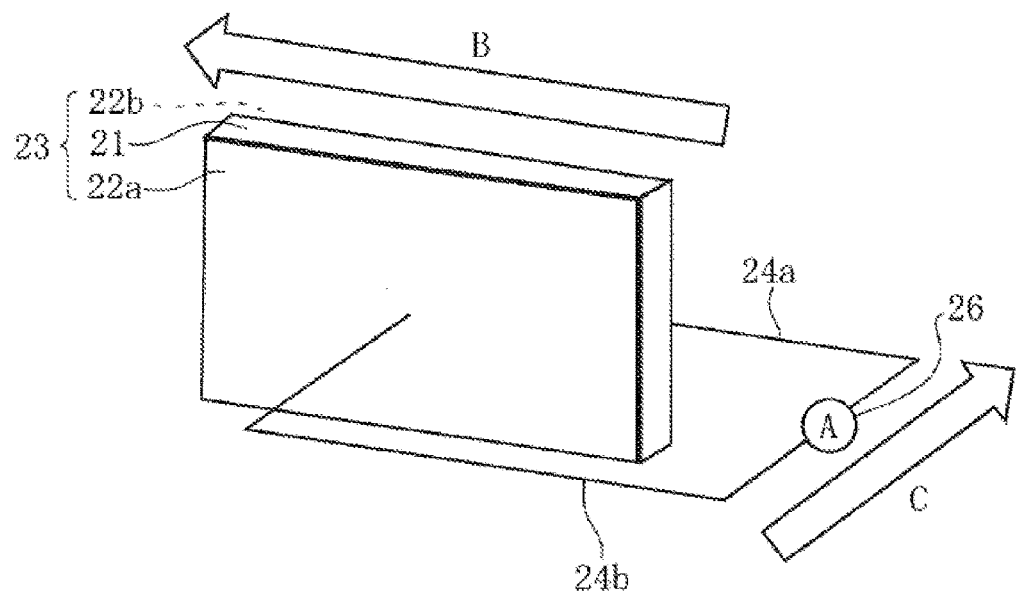
FIG. 4 is a perspective view schematically illustrating an electromagnetic current measurement device used in the examples.

FIG. 4 is a perspective view schematically illustrating a characterization device for the sample 23.

Figure 5:
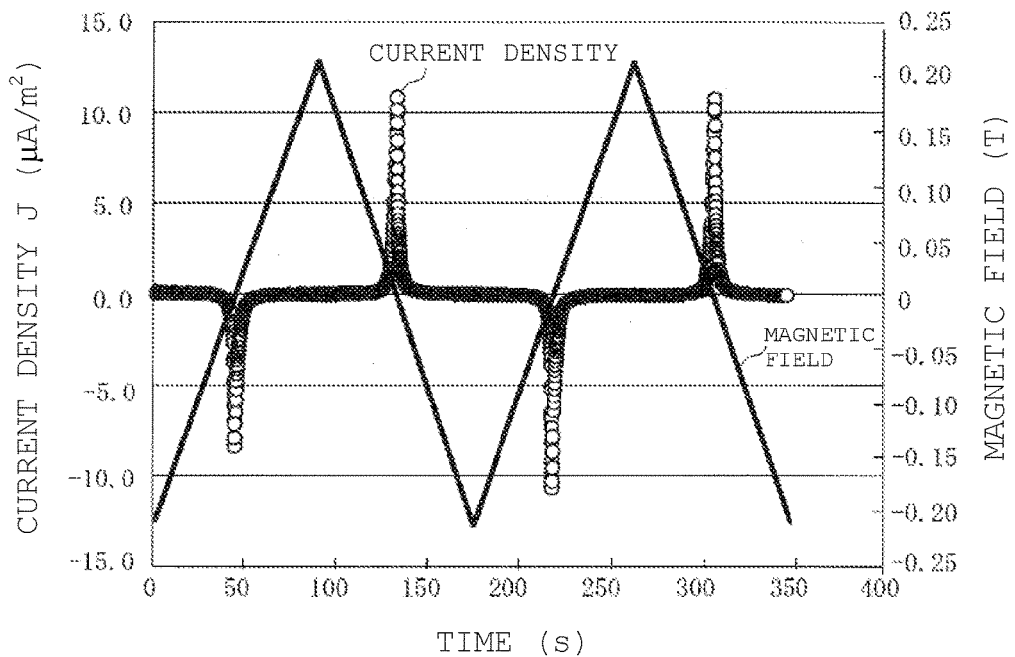
FIG. 5 is a diagram showing changes in current density and magnetic field with the passage of time for sample number 5.

This characterization device is equipped with a picoammeter (from Keithley Instruments, Inc., U.S.A., Model 6487) 26 in place of the DC power source 25 in FIG. 4, and the evaluation sample is placed so that the direction of the magnetic field applied is orthogonal to the direction of the electric field during the electric polarization, as with FIG. 5.

Then, the magnetic field was swept reciprocally multiple times at a speed of 0.1 to 1.7 T/min in a magnetic field range of 0 to 0.2 T with the use of an electromagnet while the temperature was controlled to 25° C. with a low temperature cryostat (from TOYO Corporation, Type LN-Z), and the charge discharged from the sample at that time, that is, the electromagnetic current, was measured with the picoammeter 26.

Further, among the respective samples mentioned above, for the samples of sample numbers 4 to 6, 8, 13, 15, and 22 to 25 subjected to the heat treatment after firing in the oxygen atmosphere at 0.1 MPa, polarization treatment and measurement of an electromagnetic current were performed by the following method with the use of a physical property measurement system (from Quantum Design, Inc., Model PPMS) in order to evaluate the behavior of electromagnetic characteristics in more detail.

More specifically, a DC magnetic field of −5 T was applied to a sample 23 placed as with FIG. 3 for 1 minute at a temperature of 300 K with the use of a superconducting magnet (not shown) to produce magnetic field polarization in the direction indicated by the arrow B. Then, after the measurement sample was turned into a single domain by varying the magnetic field from −5 T to −0.5 T at a speed of 18 mT/s while an electric field of 4 to 8 kV/cm was applied between the surface electrodes 22a and 22b in this condition, the electric field and the magnetic field were stopped from being applied.

Next, an electrometer (from Keithley Instruments, Inc., U.S.A., Model 6517A) was interposed between the signal line 24a and the signal line 24b in place of the DC power source 25 in FIG. 3, and while the magnetic field was swept at a speed of about 0.5 to 1 T/min, the charge discharged from the sample at that time, that is, the electromagnetic current was measured with the electrometer.

Further, the current density J of the measured electromagnetic current was integrated with respect to time to determine the electric polarization P serving as an index of ferroelectricity.

Table 1 shows the composition, the oxygen atmosphere for the heat treatment after firing, and the electric polarization P for each sample of sample numbers 1 to 25.

TABLE 1

| Sample No. | $Sr_{2-x}Ba_xCo_{2-y}Zn_yFe_{12-z}Al_zO_{22}$ | | | Oxygen Atmosphere for Heat Treatment after Firing (MPa) | Electric Polarization P (μC/m²) |
|---|---|---|---|---|---|
| | x | y | z | | |
| 1* | 1.0 | 1.0 | 1.0 | 1.0 | — |
| 2* | 1.0 | 0.9 | 1.0 | 1.0 | — |
| 3 | 1.0 | 0.8 | 1.0 | 1.0 | 5.4 |
| 4 | 1.0 | 0.4 | 1.0 | 0.1 | 17.8 |
| 5 | 1.0 | 0.0 | 1.0 | 0.1 | 17.5 |
| 6 | 1.3 | 0.4 | 1.0 | 0.1 | 13.6 |
| 7* | 1.4 | 0.4 | 1.0 | 1.0 | — |
| 8 | 0.7 | 0.4 | 1.0 | 0.1 | 12.9 |
| 9* | 0.6 | 0.4 | 1.0 | 1.0 | — |
| 10* | 1.0 | 0.4 | 0.7 | 1.0 | — |
| 11* | 1.0 | 0.0 | 0.7 | 1.0 | — |
| 12 | 1.0 | 0.8 | 0.8 | 1.0 | 5.1 |
| 13 | 1.0 | 0.0 | 0.8 | 0.1 | 15.1 |
| 14 | 1.0 | 0.8 | 1.2 | 1.0 | 5.9 |
| 15 | 1.0 | 0.0 | 1.2 | 0.1 | 16.0 |
| 16* | 1.0 | 0.8 | 1.3 | 1.0 | — |
| 17* | 1.0 | 0.0 | 1.3 | 1.0 | — |
| 18 | 1.3 | 0.8 | 0.8 | 1.0 | 6.2 |
| 19 | 0.7 | 0.8 | 0.8 | 1.0 | 5.6 |
| 20 | 1.3 | 0.8 | 1.2 | 1.0 | 6.0 |
| 21 | 0.7 | 0.8 | 1.2 | 1.0 | 6.2 |
| 22 | 1.3 | 0.0 | 0.8 | 0.1 | 10.9 |
| 23 | 0.7 | 0.0 | 0.8 | 0.1 | 11.0 |
| 24 | 1.3 | 0.0 | 1.2 | 0.1 | 12.7 |
| 25 | 0.7 | 0.0 | 1.2 | 0.1 | 13.2 |

*Outside the scope of the present invention

Sample number 1, with y of 1.0 for the Zn molar substitution ratio y/2, failed to exhibit an electromagnetic effect, because of the high content of Zn.

Sample number 2, with y of 0.9 for the Zn molar substitution ratio y/2, resulted in failure to enable the measurement of the electromagnetic current and the determination of the electric polarization P, because of the high content of Zn.

Sample number 7, with x of 1.4 for the Ba molar substitution ratio x/2, resulted in failure to enable the measurement of the electromagnetic current at room temperature and the determination of the electric polarization P, due to the relatively low molar ratio of Sr to Ba, while giving the favorable insulation property.

Sample number 9, with x of 0.6 for the Ba molar substitution ratio x/2, resulted in failure to enable the measurement of the electromagnetic current at room temperature and the determination of the electric polarization P, due to the relatively high molar ratio of Sr to Ba, while also in this case giving the sufficient insulation property.

Sample numbers 10 and 11, with z of 0.7 small for the Al molar substitution ratio z/12, resulted in failure to enable the measurement of the electromagnetic current, without inducing a helical magnetic structure for producing the electric polarization P at room temperature.

Sample numbers 16 and 17, with z of 1.3 large for the Al molar substitution ratio of z/12, while giving the favorable insulation property, produced a different phase, and blocked the generation of electromagnetic characteristics due to the production of the different phase, thereby resulting in failure to enable the measurement of the electromagnetic current at room temperature and the determination of the electric polarization P.

In contrast, it has been determined that sample numbers 3 to 6, 8, 12 to 15, and 18 to 25, with x of 0.7 to 1.3 for the molar substitution ratio x/2 of Ba, y of 0.8 or less for the molar substitution ratio y/2 of Zn, and z of 0.8 to 1.2 for the molar substitution ratio z/12 of Al, all within the scope of the present invention, have achieved ferromagnetic dielectric bodies that produce an electromagnetic effect with favorable electric polarization P of 5.0 μC/m² or more at room temperature.

In particular, it has been determined that sample numbers 4 to 6, 8, 13, 15, and 22 to 25 with y of 0.4 or less for the molar substitution ratio y/2 of Zn and a high Co content at the Co site can achieve high electric polarization P of 10 μC/m² or more, and produce a great electromagnetic effect even when the heat treatment after firing is performed at 0.1 MPa.

More specifically, it has been determined that the increased Co content at the Co site where the molar substitution ratio y/2 of Zn has y of 0.4 or less allows high electric polarization P of 10 μC/m² or more to be achieved even when the heat treatment is performed in the oxygen atmosphere at 0.1 MPa, and thus, by controlling y of the Zn molar substitution ratio y/2 to 0.4 or less can produce a great electromagnetic effect through a simpler production process.

Figure 6:
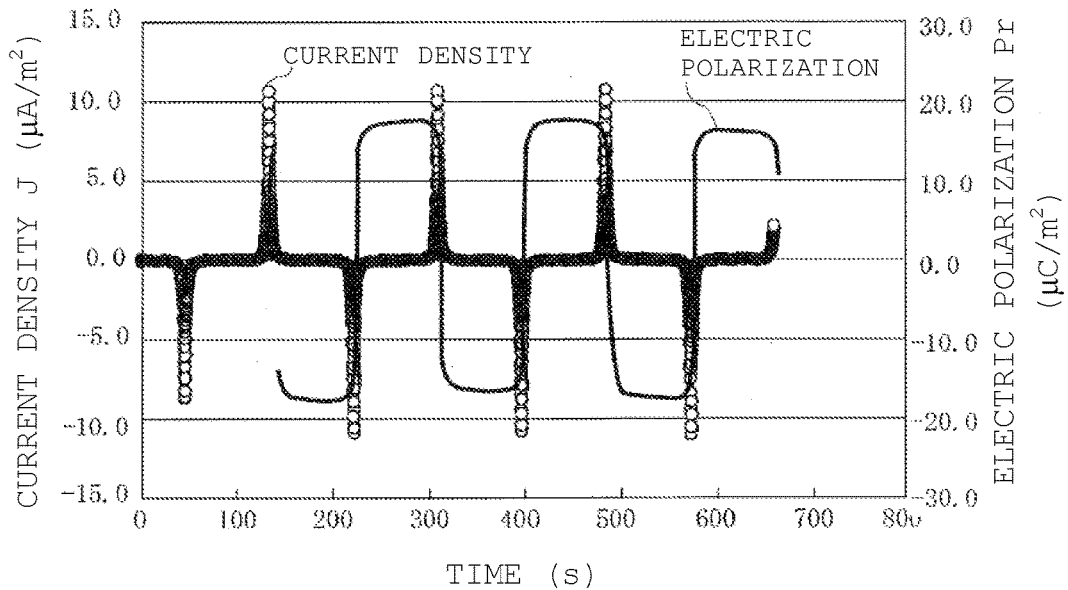
FIG. 6 is a diagram showing changes in current density and electric polarization with the passage of time for sample number 5.

FIGS. 5 and 6 show electromagnetic characteristics for sample number 5.

FIG. 5 is a diagram showing changes in magnetic field and current density J with the passage of time for sample number 5, where the horizontal axis, right vertical axis, and left vertical axis respectively indicate time (s), a magnetic field (T), and a current density J ($\mu A/m^2$).

In addition, FIG. 6 is a diagram showing changes in electric polarization P and current density J with the passage of time for sample number 5, where the horizontal axis, right vertical axis, and left vertical axis respectively indicate time (s), electric polarization P ($\mu C/m^2$), and a current density J ($\mu A/m^2$).

As shown in FIG. 5 herein, when a magnetic field is swept reciprocally multiple times at a constant speed in the range of −0.2 T to +0.2 T, an electromagnetic current flows from the sample near a zero field, thereby providing a current density J. More specifically, the electromagnetic current is observed in the zero field without being attenuated even when the magnetic field is swept continuously from −0.2 T to +0.2 T and then to −0.2 T.

Then, when the current density J of the electromagnetic current is integrated, the electric polarization P is determined, and electric polarization characteristics are obtained as in FIG. 6.

In the electric polarization characteristics, the electric polarization P is induced in a specific direction in a low magnetic field, the electric polarization P reaches zero once to disappear near the zero field which serves substantially as the zero field, and when the magnetic field is reversed from negative to positive or from positive to negative, the electric polarization P is also induced in a direction opposite to the specific direction.

As just described, in the present example, it is determined that when the polarity of the magnetic field is reversed, the polarity of the electric polarization P is also reversed.

Further, as is clear from FIG. 6 herein, with the electric polarization P of 17.5 $\mu C/m^2$ at room temperature of 300 K and in the low magnetic field, it is determined that the electric polarization P is achieved which is comparable or superior to that of the hexagonal Z-type crystal structure as in Patent Document 3.

It is to be noted that also for the other inventive samples (sample numbers 3, 4, 6, 8, 13, 15, and 22 to 25) with favorable electric polarization P obtained therefrom, the measurement of electromagnetic characteristics has confirmed that the samples exhibit, as with sample number 5, electromagnetic characteristics in which when the polarity of the magnetic field is reversed, the polarity of the electric polarization P is also reversed.

Thus, as demonstrated with the respective samples, it has been determined that oxide ceramics are obtained which have ferromagnetic dielectric characteristics at room temperature and in a low magnetic field.

Next, the electromagnetic coupling coefficient α was determined on the basis of the mathematical formula (8).

$$\alpha = (\mu_0 \cdot J)/(dB/dt) \quad (8)$$

In the formula, the magnetic permeability $\mu_0$ in a vacuum is $4\pi \times 10^{-7}$ H/m.

Figure 7:
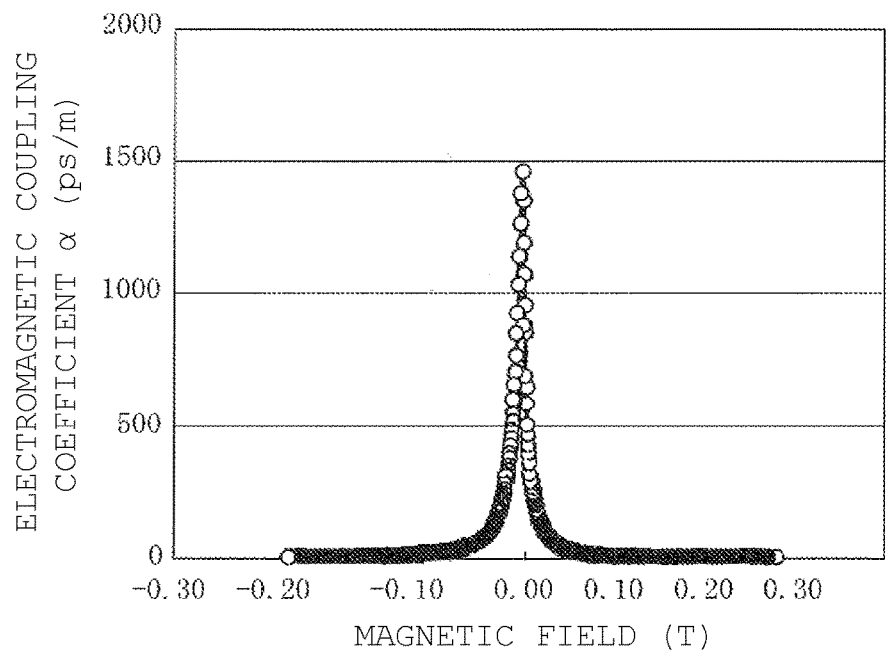
FIG. 7 is a diagram showing characteristics of the electromagnetic coupling coefficient for sample number 5.

FIG. 7 is a diagram showing the relationship between the magnetic field and the electromagnetic coupling coefficient α, where the horizontal axis indicates a magnetic field (T), whereas the vertical axis indicates an electromagnetic coupling coefficient α (ps/m).

As is clear from FIG. 7 herein, with the electromagnetic coupling coefficient α of about 1450 ps/m in the substantial zero field, it has been determined that a ferromagnetic dielectric material can be obtained which has an electromagnetic coupling coefficient α that is three times or more as large even as compared with that of Patent Document 3 (470 ps/m at a maximum).

More specifically, it has been determined that the oxide ceramic according to the present invention can achieve an electromagnetic coupling coefficient α of 1000 ps/m or more at room temperature and in the substantial zero magnetic field, and produces a great electromagnetic effect even with the electric polarization P of 5.0 $\mu C/m^2$ or more, in particular, the electric polarization P of 10 $\mu C/m^2$ or more when the molar substitution ratio y/2 of Zn at the Co site has y controlled to 0.40 or less.

EXAMPLE 2

$Fe_2O_3$, $SrCO_3$, $BaCO_3$, $Co_3O_4$, NiO, and $Al_2O_3$ were prepared as ceramic base materials.

Then, the ceramic base materials were weighed so that the x, y, and z of the molar substitution ratio x/2 of Ba, molar substitution ratio y/2 of Ni, and molar substitution ratio z/12 of Al after firing provided the compositions shown in Table 2.

Thereafter, samples of sample numbers 31 to 55 were prepared in accordance with the same method and procedure as in Example 1, except that the heat treatment after firing was performed in an oxygen atmosphere at 1 MPa for all of the samples.

Then, for each sample of sample numbers 31 to 55, the composition analysis made and the crystal structure checked in accordance with the same method and procedure as in Example 1 confirmed that each sample had the composition shown in Table 2 and had a hexagonal Y-type crystal structure. In addition, for each sample of sample numbers 31 to 55, the measurement of resistivity ρ in accordance with the same method and procedure as in Example 1 confirmed that the samples achieved sufficient insulation properties, with a resistivity ρ of 50 MΩ·cm or more.

Next, for each sample of sample numbers 31 to 55, in accordance with the same method and procedure as in Example 1, the electromagnetic current was measured, and the current density J of the measured electromagnetic current was integrated with respect to time to determine the electric polarization P serving as an index of ferroelectricity.

Table 2 shows the composition and the electric polarization P for each sample of sample numbers 31 to 55.

TABLE 2

| Sample No. | $Sr_{2-x}Ba_xCo_{2-y}Ni_yFe_{12-z}Al_zO_{22}$ | | | Electric Polarization P ($\mu C/m^2$) |
|---|---|---|---|---|
| | x | y | z | |
| 31* | 1.0 | 2.0 | 1.0 | — |
| 32* | 1.0 | 1.8 | 1.0 | — |
| 33 | 1.0 | 1.6 | 1.0 | 5.2 |
| 34 | 1.0 | 1.2 | 1.0 | 12.1 |
| 35 | 1.0 | 0.4 | 1.0 | 15.0 |
| 36 | 1.3 | 0.4 | 1.0 | 12.1 |
| 37* | 1.4 | 0.4 | 1.0 | — |
| 38 | 0.7 | 0.4 | 1.0 | 10.8 |
| 39* | 0.6 | 0.4 | 1.0 | — |
| 40* | 1.0 | 1.6 | 0.7 | — |
| 41* | 1.0 | 0.4 | 0.7 | — |
| 42 | 1.0 | 1.6 | 0.8 | 5.2 |

TABLE 2-continued

| Sample No. | $Sr_{2-x}Ba_xCo_{2-y}Ni_yFe_{12-z}Al_zO_{22}$ | | | Electric Polarization P ($\mu C/m^2$) |
|---|---|---|---|---|
| | x | y | z | |
| 43 | 1.0 | 0.4 | 0.8 | 12.2 |
| 44 | 1.0 | 1.6 | 1.2 | 5.9 |
| 45 | 1.0 | 0.4 | 1.2 | 13.9 |
| 46* | 1.0 | 1.6 | 1.3 | — |
| 47* | 1.0 | 0.4 | 1.3 | — |
| 48 | 1.3 | 1.6 | 0.8 | 5.7 |
| 49 | 0.7 | 1.6 | 0.8 | 5.6 |
| 50 | 1.3 | 1.6 | 1.2 | 5.1 |
| 51 | 0.7 | 1.6 | 1.2 | 5.2 |
| 52 | 1.3 | 0.4 | 0.8 | 13.1 |
| 53 | 0.7 | 0.4 | 0.8 | 10.1 |
| 54 | 1.3 | 0.4 | 1.2 | 12.0 |
| 55 | 0.7 | 0.4 | 1.2 | 11.6 |

*Outside the scope of the present invention

Sample number 31, with y of 2.0 for the Ni molar substitution ratio y/2, failed to exhibit an electromagnetic effect, because of the high content of Ni.

Sample number 32, with y of 1.8 for the Ni molar substitution ratio y/2, resulted in failure to enable the measurement of the electromagnetic current and the determination of the electric polarization P, because of the high content of Ni.

Sample number 37, with x of 1.4 for the Ba molar substitution ratio x/2, resulted in failure to enable the measurement of the electromagnetic current at room temperature and the determination of the electric polarization P, due to the relatively low molar ratio of Sr to Ba, while giving the favorable insulation property, as with sample number 7 according to Example 1.

Sample number 39, with x of 0.6 for the Ba molar substitution ratio x/2, resulted in failure to enable the measurement of the electromagnetic current at room temperature and the determination of the electric polarization P, due to the relatively high molar ratio of Sr to Ba, while also in this case giving the sufficient insulation property, as with sample number 9 according to Example 1.

Sample numbers 40 and 41, with z of 0.7 small for the Al molar substitution ratio z/12, resulted in failure to enable the measurement of the electromagnetic current, without inducing a helical magnetic structure for producing the electric polarization P at room temperature, as with sample numbers 10 and 11 according to Example 1.

Sample numbers 46 and 47, with z of 1.3 large for the Al molar substitution ratio of z/12, while giving the favorable insulation property, produced a different phase, and blocked the generation of electromagnetic characteristics due to the production of the different phase, thereby resulting in failure to enable the measurement of the electromagnetic current at room temperature and the determination of the electric polarization P, as with sample numbers 16 and 17 according to Example 1.

In contrast, it has been determined that sample numbers 33 to 36, 38, 42 to 45, and 48 to 55, with x of 0.7 to 1.3 for the molar substitution ratio x/2 of Ba, y of 1.6 or less for the molar substitution ratio y/2 of Ni, and z of 0.8 to 1.2 for the molar substitution ratio z/12 of Al, all within the scope of the present invention, have achieved ferromagnetic dielectric bodies that produce an electromagnetic effect with favorable electric polarization P of 5.0 $\mu C/m^2$ or more at room temperature.

Figure 8:
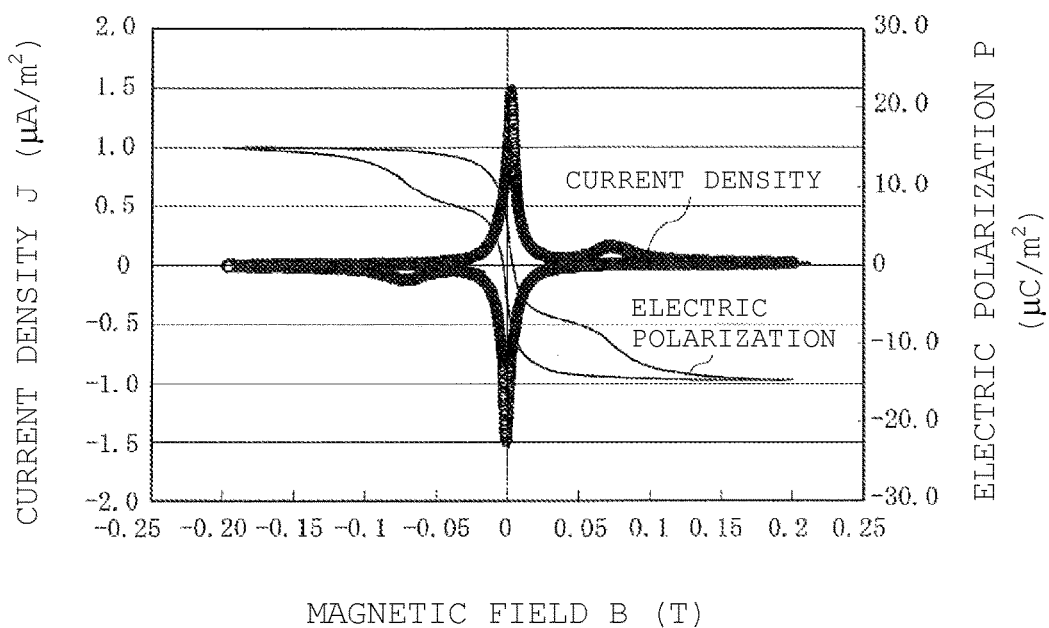
FIG. 8 is a diagram showing changes in current density and electric polarization with the passage of time for sample number 35.

FIG. 8 is a diagram showing changes in magnetic field and current density J with the passage of time for sample number 35, where the horizontal axis, right vertical axis, and left vertical axis respectively indicate a magnetic field (B), electric polarization P ($\mu C/m^2$), and a current density J ($\mu A/m^2$). The diagram shows electromagnetic characteristics.

As shown in FIG. 8 herein, when a magnetic field is swept reciprocally at a constant speed in the range of −0.2 T to +0.2 T, an electromagnetic current flows from the sample near a zero field, thereby providing a current density J. More specifically, the electromagnetic current is observed in the zero field without being attenuated even when the magnetic field is swept continuously from −0.2 T to +0.2 T and then to −0.2 T.

It has been determined that as just described, the electric polarization P is induced in a weak magnetic field, and the electric polarization P disappears in the zero field.

In addition, it has also been determined that when the polarity of the magnetic field B is reversed from negative to positive or from positive to negative, the polarity of the electric polarization P is also reversed from positive to negative or from negative to positive.

Figure 9:
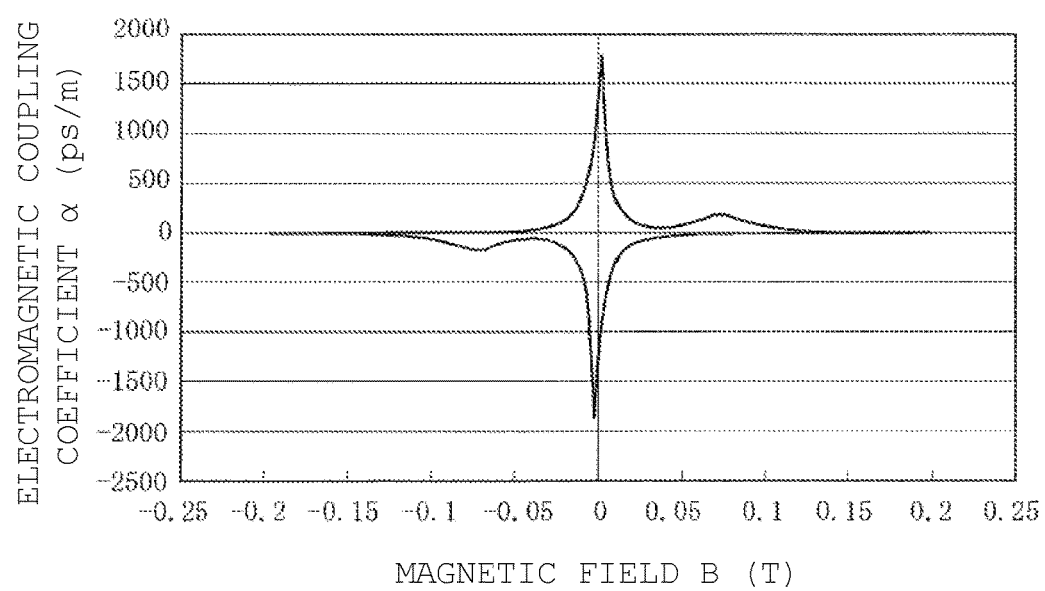
FIG. 9 is a diagram showing characteristics of the electromagnetic coupling coefficient for sample number 35.

FIG. 9 is a diagram showing the relationship between the magnetic field and the electromagnetic coupling coefficient α, where the horizontal axis indicates a magnetic field (T), whereas the vertical axis indicates an electromagnetic coupling coefficient α (ps/m).

As is clear from FIGS. 8 and 9 herein, it has been confirmed that the polarity of the electric polarization P also varies depending on the polarity of the magnetic field B, and accordingly, the polarity of the electromagnetic coupling coefficient α is also reversed. Further, with the electromagnetic coupling coefficient α of about 1800 ps/m in terms of absolute value in the substantial zero field, it has been determined that a ferromagnetic dielectric material can be obtained which has a large electromagnetic coupling coefficient α.

More specifically, it has been determined that the oxide ceramic according to the present invention can achieve a large electromagnetic coupling coefficient α at room temperature and in the substantial zero magnetic field, and produces a great electromagnetic effect even with the electric polarization P of 5.0 $\mu C/m^2$ or more.

EXAMPLE 3

$Fe_2O_3$, $SrCO_3$, $BaCO_3$, $Co_3O_4$, $ZnO$, $NiO$, and $Al_2O_3$ were prepared as ceramic base materials.

Then, the ceramic base materials were weighed so that the x, y, and z of the molar substitution ratio x/2 of Ba, molar substitution ratio y/2 of ($Zn_uNi_{1-u}$), and molar substitution ratio z/12 of Al after firing, and the molar combination ratio u of Zn to the total of Zn and Ni at the Co site provided the compositions shown in Table 3.

Thereafter, samples of sample numbers 61 to 66 were prepared in accordance with the same method and procedure as in Example 1, except that the heat treatment after firing was performed in an oxygen atmosphere at 1 MPa for all of the samples.

Then, for each sample of sample numbers 61 to 66, the composition analysis made and the crystal structure checked in accordance with the same method and procedure as in Example 1 confirmed that each sample has the composition shown in Table 3 and had a hexagonal Y-type crystal structure. In addition, for each sample of sample numbers 61 to 66, the measurement of the resistivity ρ in accordance with the same method and procedure as in Example 1 confirmed that the samples achieved sufficient insulation properties, with a resistivity ρ of 50 MΩ·cm or more.

Next, for each sample of sample numbers 61 to 66, in accordance with the same method and procedure as in Example 1, the electromagnetic current was measured, and the current density J of the measured electromagnetic current was integrated with respect to time to determine the electric polarization P serving as an index of ferroelectricity.

Table 3 shows the composition and the electric polarization P for each sample of sample numbers 61 to 66.

TABLE 3

| Sample No. | $Sr_{2-x}Ba_xCo_{2-y}(Zn_uNi_{1-u})_yFe_{12-z}Al_zO_{22}$ | | | | Electric Polarization P ($\mu C/m^2$) |
|---|---|---|---|---|---|
| | x | y | z | u | |
| 61 | 1.0 | 0.4 | 1.0 | 0.25 | 8.2 |
| 62 | 1.0 | 0.8 | 1.0 | 0.25 | 5.3 |
| 63 | 1.0 | 0.4 | 1.0 | 0.50 | 7.9 |
| 64 | 1.0 | 0.8 | 1.0 | 0.50 | 6.2 |
| 65 | 1.0 | 0.4 | 1.0 | 0.75 | 7.5 |
| 66 | 1.0 | 0.8 | 1.0 | 0.75 | 6.5 |

As is clear from sample numbers 61 to 66, it has been determined that a ferromagnetic dielectric body is achieved which produces an electromagnetic effect with favorable electric polarization P of 5.0 μC/m² or more at room temperature, even when Zn and Ni are contained at the Co site and when the combination ratio between Zn and Ni is varied within the scope of the present invention.

The oxide ceramic can be achieved which has a favorable insulation property, and can achieve a greater electromagnetic coupling coefficient than ever before at room temperature on the order of 300 K and in a substantial zero field, and produce ferromagnetic dielectric characteristics with favorable electric polarization P in a low magnetic field, and the use of the oxide ceramic makes it possible to achieve various types of ceramic electronic components such as variable inductors, magnetic sensors, and non-volatile memories.

DESCRIPTION OF REFERENCE SYMBOLS 1 component base body
2a, 2b external electrode
3a to 3c internal electrode

The invention claimed is:

1. An oxide ceramic comprising:
a ferrite compound containing at least Sr, Ba, Co, and Fe,
wherein the Ba is contained in a form of substitution for some of the Sr, and x is 0.7 to 1.3 when a content of the Ba is expressed as x/2 in molar ratio with respect to a total of the Ba and the Sr,
at least either one element M of Zn and Ni is contained in a form of substitution for some of the Co, and when a content of the element M is expressed as y/2 in molar ratio with respect to a total of the element M and the Co,
y is 0.8 or less when the element M is the Zn and when the element M is combined so that a content of the Zn is equal to or more than a content of the Ni in molar ratio, or
y is 1.6 or less when the element M is the Ni and when the element M is combined so that the content of the Zn is less than the content of the Ni in molar ratio, and
Al is contained in a form of substitution for some of the Fe, and z is 0.8 to 1.2 when a content of the Al is expressed as z/12 in molar ratio with respect to a total of the Al and the Fe.

2. The oxide ceramic according to claim 1, wherein the oxide ceramic has a hexagonal Y-type crystal structure.

3. The oxide ceramic according to claim 1, wherein the ferrite compound is represented by a general formula $[Sr_{2-x}Ba_xCo_{2-y}(Zn_uNi_{1-u})_yFe_{12-z}Al_zO_{22}]$, where $0 \leq y \leq 0.8$ and $0.5 \leq u \leq 1.0$.

4. The oxide ceramic according to claim 1, wherein the ferrite compound is represented by a general formula $[Sr_{2-x}Ba_xCo_{2-y}(Zn_uNi_{1-u})_yFe_{12-z}Al_zO_{22}]$, where $0 \leq y \leq 1.6$ and $0 \leq u < 0.5$.

5. The oxide ceramic according to claim 2, wherein the y is 0.4 or less.

6. The oxide ceramic according to claim 3, wherein the y is 0.4 or less.

7. The oxide ceramic according to claim 4, wherein the y is 0.4 or less.

8. The oxide ceramic according to claim 5, wherein the oxide ceramic was heat treated in an air atmosphere.

9. The oxide ceramic according to claim 6, wherein the oxide ceramic was heat treated in an air atmosphere.

10. The oxide ceramic according to claim 7, wherein the oxide ceramic was heat treated in an air atmosphere.

11. The oxide ceramic according to claim 1, wherein the oxide ceramic has a maximum value electromagnetic coupling coefficient in a substantial zero field magnetic field.

12. The oxide ceramic according to claim 1, wherein the oxide ceramic is structured such that a polarity of electric polarization is reversed when a polarity of a magnetic field is reversed.

13. A ceramic electronic component comprising:
a component base body and
an external electrode on a surface of the component base body,
wherein the component base body is formed from the oxide ceramic according to claim 1.

14. The ceramic electronic component according to claim 13, further comprising a coil disposed around the component base body, wherein the coil has an inductance that depends on a magnetic permeability of the component base body.

15. The ceramic electronic component according to claim 14, further comprising an internal electrode embedded in the component base body.

16. The ceramic electronic component according to claim 13, further comprising an internal electrode embedded in the component base body.

17. The ceramic electronic component according to claim 13, wherein the ferrite compound is represented by a general formula $[Sr_{2-x}Ba_xCo_{2-y}(Zn_uNi_{1-u})_yFe_{12-z}Al_zO_{22}]$, where $0 \leq y \leq 0.8$ and $0.5 \leq u \leq 1.0$.

18. The ceramic electronic component according to claim 13, wherein the ferrite compound is represented by a general formula $[Sr_{2-x}Ba_xCo_{2-y}(Zn_uNi_{1-u})_yFe_{12-z}Al_zO_{22}]$, where $0 \leq y \leq 1.6$ and $0 \leq u < 0.5$.

19. The ceramic electronic component according to claim 17, wherein the y is 0.4 or less.

20. The ceramic electronic component according to claim 18, wherein the y is 0.4 or less.

* * * * *